United States Patent
Atwell et al.

[15] 3,682,201
[45] Aug. 8, 1972

[54] TEXTILE-REINFORCED ALL-POLYMERIC HOSE

[72] Inventors: William J. Atwell, Bloomingdale; Lawrence Cranston, Ramsey, both of N.J.

[73] Assignee: Uniroyal, Inc., New York, N.Y.

[22] Filed: Sept. 22, 1970

[21] Appl. No.: 74,366

Related U.S. Application Data

[63] Continuation-in-part of Ser. No. 55,784, July 17, 1970.

[52] U.S. Cl. ..................138/125, 138/137, 156/149, 156/244
[51] Int. Cl. ...........................................F16l 11/04
[58] Field of Search...........................138/121–153; 57/140 R, 153; 156/148, 149, 244

[56] References Cited

UNITED STATES PATENTS

| | | | |
|---|---|---|---|
| 3,223,565 | 12/1965 | Fritz et al. | 156/148 |
| 2,766,164 | 10/1956 | Salem | 138/DIG. 7 |
| 3,560,284 | 2/1971 | Wisotsky et al. | 156/148 |

FOREIGN PATENTS OR APPLICATIONS

| | | | |
|---|---|---|---|
| 249,720 | 2/1964 | Australia | 156/148 |
| 1,329,186 | 4/1963 | France | 156/148 |

*Primary Examiner*—Houston S. Bell, Jr.
*Attorney*—Robert J. Patterson

[57] ABSTRACT

An all-polymeric textile-reinforced hose particularly suited for pressure service, typically an all-nylon hose, and a method of making same are disclosed. The hose comprises an inner thermoplastic tube, at least one knitted layer of thermoplastic textile reinforcement, and a polymeric outer protective jacket. The innermost reinforcing layer is fused to the inner tube and any successive reinforcement layers are fused to one another. This fusion is typically accomplished by plasticizing with a resorcinol-water solution and juxtaposition of the components to be joined after which the resorcinal plasticizing agent is removed with a water bath. Before the outer polymeric jacket is applied, the assembly is plasticized with a plasticizing agent which is thereafter removed; this effects activation of the plastic in the outer knitted textile layer and such activation, coupled with the activation in the rest of the structure as a result of previous treatments with a softening agent and removal thereof, enhances the bonding of the outer jacket to the assembly.

The textile reinforcement may be constituted by synthetic multifilament yarns made of continuous thermoplastic filaments, having a total twist (including any so-called producer's or manufacturer's twist) of from 0 to 15 turns per inch, preferably from 1 to 5 turns per inch. Alternatively, but generally less preferably, the reinforcement may be formed of thermoplastic staple yarns or of so-called monofils.

9 Claims, 4 Drawing Figures

Patented Aug. 8, 1972

INVENTORS
W. J. ATWELL
L. CRANSTON
BY
Robert J. Patterson
ATTORNEY

Patented Aug. 8, 1972

INVENTORS
W. J. ATWELL
BY L. CRANSTON

Robert J. Patterson
ATTORNEY

TEXTILE-REINFORCED ALL-POLYMERIC HOSE

REFERENCE TO OTHER APPLICATIONS

Our copending application, Ser. No. 55,784 filed July 17, 1970 as a continuation-in-part of our prior copending application (now abandoned) Ser. No. 818,236 filed Apr. 22, 1969, is directed to textile-reinforced all-polymeric hose wherein the textile reinforcement is spirally or helically wrapped about the inner tube and is fusion bonded thereto and wherein adjoining textile wraps are fusion bonded to each other. Our copending application Ser. No. 74,268 filed Sept. 22, 1970 is directed to textile-reinforced all-polymeric hose comprising an inner thermoplastic tube, a woven layer of thermoplastic textile reinforcement fused to the inner tube, and a polymeric outer protective jacket.

BACKGROUND OF THE INVENTION

It is old, as in Koch U.S. Pats. Nos. 2,977,839 and 3,251,381, to make an all-nylon textile-reinforced plastic hose by plasticizing the surface of nylon tubing, applying a braided nylon textile reinforcement to the plasticized surface while it is plasticized, curing this assembly by passing it through a water bath to remove plasticizing agent, heating the resulting assembly, plasticizing the braid reinforcement and immediately extruding a nylon sheath over the plasticized surface of the braid. As is shown by the explicit teachings throughout of these patents, and by actual commercial practice in the manufacture of all-nylon hose of this type, it has always been thought by others that no form of textile reinforcement other than braided nylon reinforcement could be used with any promise of success.

Our invention resides in our discovery that it is possible to use circular knitted thermoplastic textile reinforcement in manufacturing all-polymeric hose particularly suitable for pressure service, preferably all-nylon hose, and to thereby obtain a hose which is as good as hose reinforced with braided textile as in the Koch patents. Hose made in accordance with the present invention is suitable for pressure service such as in refrigeration, air conditioning, and hydraulic, pneumatic and other applications.

SUMMARY OF THE INVENTION

Briefly stated, our invention resides in the discovery that we can make a very successful all-polymeric, integral hose especially adapted for pressure service, preferably an all-nylon hose, comprising an inner thermoplastic (e.g. nylon) tubes, a knitted layer of thermoplastic (e.g. nylon) textile reinforcing elements disposed around the tube in direct contact therewith and fused in a manner hereinafter described to the outer surface of the tube at the interface or areas of contact between the elements of the knitted reinforcing layer and the tube, and an outer protective polymeric (e.g. nylon) jacket surrounding the assembly and bonded thereto.

In its broad method aspects, our invention comprises providing an inner thermoplastic tube with a circular knitted layer of thermoplastic textile reinforcement around and in direct contact with the outer surface of the tube, and applying an outer protective polymeric jacket around the resulting assembly.

Our hose can embody only a single circular knitted layer of the thermoplastic textile reinforcement or it can embody several such circular knitted layers disposed annularly with respect to each other and to the inner tube. Because of limitations on the stiffness of the hose, we often use only one such knitted layer and we seldom apply more than two such knitted layers. Where two or more such knitted layers are employed, the successive layers are fusion bonded to one another at their points or areas of contact in a manner described in detail below.

In its broad method aspects, one or more circular knitted layers of thermoplastic (e.g. nylon) textile reinforcing elements are disposed in any suitable manner around a thermoplastic (e.g. nylon) inner tube. The knitted layer adjacent the inner tube is fused to the outer surface of the tube at the interface therebetween, and any succeeding knitted layers are fused to one another. This fusion is preferably achieved by plasticizing the thermoplastic components to be bonded together, as with a resorcinol-water solution or other agent capable of plasticizing the thermoplastic material of the components to be bonded together, holding the components in contact with one another and relatively immobilized while they are so plasticized until fusion bonding takes place, and then removing the plasticizing agent, usually with a solvent therefor such as water in the case of resorcinol, thereby stopping the plasticizing action.

In the preferred practice of our invention, we insure that the exposed portions of the assembly which is provided with the outer jacket are activated prior to jacketing by plasticization thereof with a plasticizing agent which is removed before application of the outer jacket. This activation may be accomplished either by a special sequence of plasticizing and plasticizer removal steps interposed between application of the outermost circular knitted layer and jacketing, or it may have been effected during prior treatment of the assembly to effect fusion bonding of the inner knitted layer to the inner tube and/or fusion bonding of the outermost knitted layer to the next preceding knitted layer.

We can dispose the circular knitted textile reinforcing layer about the inner tube in a number of ways. The preferred way is to pass the inner tube, which has been plasticized through a circular knitting machine, such as is shown on pages 20 and 21 of "Hose Handbook," published 1962 by The Rubber Manufacturers Association, which knits the circular textile wrap directly around the plasticized tube, whereby fusion bonding takes place during and shortly after the application of the circular knit reinforcing layer. Alternatively, we can circular knit such a layer on the unplasticized tube and thereafter subject the assembly to plasticization to effect the desired fusion bonding.

The knit may be plain stitch, lock stitch, diamond stitch, square stitch, the so-called "wrap knit" shown in the Singer Company-Fidelity Division bulletin referred to in the next paragraph, or of any other type.

Further details of knitting equipment and of types of knit stitches which can advantageously be used in the practice of this invention are given in Bulletin HR63 entitled "Fidelity Hose Reinforcement Machines for Rubber and Plastic Hose Extrusions" published by The Singer Company-Fidelity Division.

Where two or more layers of circular knit textile reinforcement are used, we prefer to apply each successive knit layer with a circular knitting machine to the plasticized assembly while it is still wet with the plasticizing agent, thus achieving the desired fusion bonding of each new knit layer to the preceding knit layer, following each such fusion bonding with a plasticizing agent removal step. We typically activate the exterior of the final knit layer in the manner described herein, and then apply the outer jacket.

In a further alternative procedure, we can apply successive circular knit layers of thermoplastic textile reinforcement without any plasticization of inner tube or knit layers, and then subject the composite assembly of inner tube and two or more successive circular knit layers to treatment to effect the desired fusion bonding of the first or inner knit layer to the inner tube and fusion bonding of all adjoining knit layers to each other.

Another method of proceeding is to circular knit the textile reinforcement separately in the form of a sleeve and to pull a length of this knit sleeve over the thermoplastic inner tube after which the assembly is subjected to the fusion bonding sequence described herein, followed by application of the outer jacket.

Other aspects of our invention will be apparent from the following description.

Figure 1:
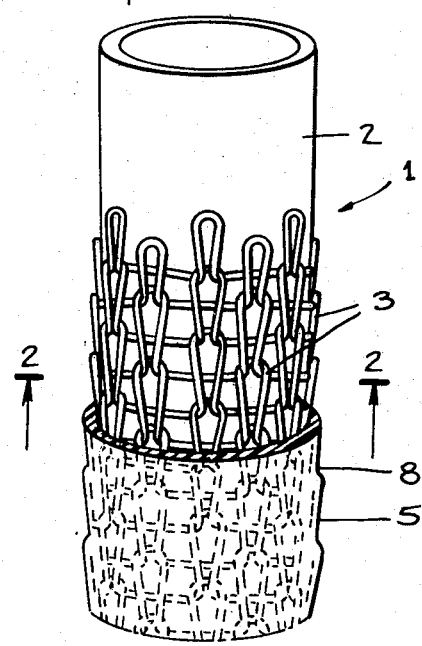
FIG. 1 is a view of a short length of typical hose of the invention having a single layer of circular lock stitch knit textile reinforcement, portions of the hose wall being cut away to show details of construction.

In the drawings the size and spacing of the reinforcing textile elements are exaggerated somewhat for purposes of illustration.

DETAILED DESCRIPTION OF INVENTION

The production of an all-nylon hose in accordance with our invention will now be described with reference to the accompanying drawings.

A nylon tube 2 is supplied from a tube source 20 which can be either an extruder or a supply of previously manufactured nylon tubing. Tube 2 is passed through a bath 21 of resorcinol-water solution which contains such a concentration of resorcinol and is maintained at such a temperature that when these factors are correlated with time of exposure the outer surface of the tube is softened and plasticized. The externally softened tube is then passed vertically upwardly through a vertical circular knitting machine 22 which applies a knit layer 3 of nylon textile reinforcing yarns. The assembly then passes over capstan 23 and down into water bath 24. The time elapsed between application of the knit textile layer 3 by unit 22 and removal of resorcinol in bath 24 is such that the yarns of the knit layer 3 are fused to the outer surface of tube 2 as indicated at 4 in FIGS. 2 and 3. It will be understood that the surfaces of the yarns of the knit layer 3 in contact with the softened out surface of tube 2 are also softened or plasticized by the action of the resorcinol-water solution and thereby caused to fuse and merge integrally with the surface of tube 2 at the interface.

The assembly is then passed through drying oven 25 which serves to remove substantially all water therefrom and prevent undesired dilution of the resorcinol in the next bath 26 (or 31) which is often substantially identical with bath 21 and maintained under similar or the same conditions.

If only one circular knit layer is to be provided, the dried assembly leaving drying oven 25 is then passed through activating bath 31 for plasticization of the outer portions of the knit layer 3 and then through water bath 32 and drying oven 33 after which the outer jacket 5 is applied in unit 34.

If two circular knit layers are desired, the assembly leaving oven 25 is then passed through resorcinol-water bath 26 wherein the exterior portions of the first knit layer 3 of yarns are softened and plasticized by the resorcinol. The assembly then passes vertically upwardly through vertical circular knitting machine 27 which applies a second layer 6 (see FIG. 3) of circular knit nylon yarns around the first layer 3 of knit yarns. The result is that the contacting areas of yarns in the second knit layer 6 are softened or plasticized by the action of the resorcinol solution and caused to fuse or coalesce with the corresponding areas of yarns of the first knit layer 3 to form integrally bonded areas.

The assembly then passes around capstan 28 and vertically downwardly into water bath 29 which again serves to remove substantially all of the resorcinol. The time elapsed between application of the second knit layer of textile yarns and the short-stopping of the resorcinol plasticizing agent in water bath 29 is such that fusion of the yarns in the two knit layers takes place at the areas of contact therebetween some of which are indicated by reference numeral 7 in FIG. 3.

The water-wet assembly then passes through drying oven 30 to remove the water and again prevent dilution of the next resorcinol bath 31 through which the assembly passes. The action of the resorcinol-water solution of bath 31 is to soften and plasticize the outer surfaces of the yarn elements of the second circular knit layer 6 (or the first circular knit layer 3 in the case where only one knit layer is employed) and effect a change therein such that even though the resorcinol contained in the resulting assembly is removed when it is passed through water bath 32, followed by removal of water in drying oven 33, the nylon outer jacket 5 subsequently applied by extruder 34 is unexpectedly strongly bonded to the resulting activated surface. The action in extruder 34 is such that the extruded nylon is forced, at the high temperature and pressure used in the extrusion step, into the accessible interstices of the assembly.

The assembly leaving extruder 34 is allowed to cool to solidify the hot nylon or other thermoplastic material applied in extruder 34, thus giving the final product 1 which may be wound up, if desired, as on take-up reel 35.

When the outer jacket 5 is formed from a thermosetting or vulcanizable polymeric material, the assembly leaving extruder 34 is subjected to any suitable treatment to effect curing or vulcanization of the polymeric jacket.

In view of the explicit teachings of the Koch patents cited above that braided textile reinforcement must be used, it was completely unexpected and unobvious to find that it is possible to use circular knit thermoplastic textile reinforcement.

The circular knit textile reinforcement used in the present invention offers great commercial advantage over braided reinforcement in that it is possible to circular knit at a speed much greater than that with which braid can be applied, typically at least six times greater. Greater latitude as to types of yarns that can be used is also possible with circular knitting than with braiding.

An important feature of our invention is that our outer polymeric jacket 5 is tightly bonded to all of the accessible or exposed portions of the underlying assembly, namely any accessible exposed outer portions of the inner tube and exposed portions of the layer or layers of circular knit textile reinforcement surrounding the same. We believe that this type of bonding is to an important extent attributable to activation of the aforementioned exposed portions by the plasticization effected by the resorcinol-water bath of other plasticizing agent. The enhanced bonding by reason of this activation is unexpectedly achieved despite the removal of virtually all, or all, of the plasticizing agent in the removal step or steps which precede application of the outer jacket. We do not fully understand the mechanism of this activation of the exposed surfaces of the several components in the assembly; it may be due to a chemical or quasi-chemical interaction between the plastic of those components and the plasticizing agent or to some sort of etching of the exposed surfaces by that agent. In any event it is not destroyed by the removal of substantially all of the resorcinol or other softener in the bath of water or other solvent therefor.

When nylon or other thermoplastic material is used to form the outer jacket, tight bonding of the outer jacket is also in part attributable to the high temperature (typically 430°–500° F.) at which the thermoplastic material is extruded around the assembly.

The tight bonding of the outer jacket, whether made of thermoplastic, thermosetting or vulcanizable material is further attributable to the fact that in its application in the extrusion operation the polymeric material used in the jacket actually penetrates into and fills all of the accessible interstices in the assembly.

It will be understood that the polymeric material of the extruded jacket 5 penetrates the assembly around the knitted textile reinforcing elements and in almost every case, especially where only a single knitted layer is used, into contact with the inner nylon tube. The polymeric material of the jacket thus envelopes and surrounds the textile reinforcing elements of the knitted layer or layers to the extent that such envelopment is possible.

VARIABLES

It will be understood that the details of the drawings and this specification are given for illustrative purposes only and are not limiting. Thus, for example, while we have referred to vertical knitters 22 and 27 we are not limited thereto but could use circular knitting units of any suitable type such as horizontal knitters. Likewise, as will be obvious, we are not restricted to using capstans 23 and 28 but could use any form of take away means, e.g. a "caterpillar." Similarly, instead of using drying ovens 25, 30 and 33 to remove water we could expose the assembly in each instance to relatively dry air at ambient or elevated temperature for a time sufficiently extended to remove the water; alternatively we could use any other suitable drying means such as infrared units, microwave units, etc. Again, while we have portrayed a continuous process, we could carry out the precess in a non-continuous manner.

The conditions under which the plasticizing, fusion and removal of plasticizing agent are carried out can vary widely. Those skilled in the art will be readily able to select suitable conditions such as concentration of plasticizer and temperature of the softening baths, time of plasticization, and temperature of the solvent baths used to remove plasticizer, so as to achieve the desired results.

With reference to the kind of plastic used, we prefer to use nylon (polyamide) throughout our hose, i.e. for the inner tube, the circular knitted reinforcement and the outer jacket. Any type of nylon can be used, such as nylon 6 (polyhexamethylene adipamide) or nylon 66 (polymerized epsilon caprolactam), a copolymer of nylon 6 and nylon 66, or nylon 11.

Instead of nylon, we can less preferably use other thermoplastic materials, such as polyesters, e.g. poly(ethylene terephthalate) such as "Dacron" (trademark) or "Terylene" (trademark), vinyl plastics such as polyvinyl chloride or copolymers of vinyl chloride and vinyl acetate such as "Vinyon," acrylic plastics such as those which are largely based on acrylonitrile, e.g. "Dynel" (trademark), "Orlon" (trademark), "Acrilan" (trademark) and "Creslan" (trademark), vinylidene chloride polymers and copolymers such as "Saran" (trademark), polyolefins such as polypropylene, etc. See "Man-Made Fibers" by Moncrieff, published 1966 by Wiley, for descriptions of these various materials and their chemistry.

We prefer to use the same kind or type of plastic throughout our hose but we can use different plastics for different components provided they are compatible and miscible with one another so that they will fuse with each other to form an integral bond and provided a practical common softening or plasticizing agent is available to effect their softening or plasticization and to effect fusing of the inner knitted layer to the inner tube and of the adjacent knitted layers to one another. In this connection the effect to be achieved is surface plasticizing or softening and not necessarily swelling. Too much swelling would result in lack of the necessary dimensional control.

Any material capable of achieving the necessary softening or plasticizing can be used to effect the fusion as well as the desired activation in preparation for reception of the outer jacket. While a gaseous softening agent could conceivably be used, in practice we almost invariably use a liquid softener. The softener is of course selected with reference to the particular plastic. For nylon, we prefer to use a resorcinol-water solution but we could use a resorcinol-ethanol solution or fluorinated ketones, such as hexafluoroacetone, which could be used either as a gas or in the liquid hydrate forms or as an aqueous solution. For polyesters we can use hot meta-cresol in water or a cold aqueous solution of ortho-chlorophenol as the softening agent. Those skilled in the art can readily select suitable plasticizing or softening agents for use with the various thermoplastics as by consulting such treatises as the above-mentioned Moncrieff book.

In some cases it may be desirable to use different solvating agents in the three solvating steps carried out in baths 21, 26 and 31. Thus when nylon 11 is used in the inner tube 2 we may use hexafluoroacetone trihydrate in bath 21 and we may use resorcinol-water solutions in baths 26 and 31. Furthermore, in some cases as where the process is operated continuously, it may be possible to eliminate baths 24 and 29 and rely upon the third bath 32 to effect substantially complete removal of all solvating agent or agents in the assembly prior to the application of the outer jacket.

The removal of the softening or plasticizing agent is generally accomplished by passing the assembly through a liquid bath of any suitable solvent capable of removing such agent. Instead of using a liquid bath, it would be possible to flood or cascade the washing medium onto the assembly to remove the softener. The selection of a solvent to achieve removal of the plasticizer is well within the skill of the art. For example, for removing water-soluble softeners or plasticizers, such as resorcinol or hexafluoroacetone, we generally use water but we could use ethanol or aqueous ethanol.

Removal of substantially all of the softener or plasticizer from the assembly prior to the application of the outer jacket is preferred since otherwise residual softener may cause undesired loss of strength in the reinforcing elements.

The polymeric material from which the outer jacket is formed can be either thermoplastic or thermosetting, the latter types of material requiring after-treatment in any suitable way to effect curing. Any thermoplastic material such as those already mentioned or any other suitable thermoplastic polymeric material, e.g. thermoplastic polyurethanes, such as "Roylar" (trademark), S-B-S block copolymers of butadiene and styrene, such as "Kraton" (trademark) and "Thermolastic" (trademark) can be used. Examples of suitable thermosetting materials include curable polyurethanes, curable elastomers, such as natural rubber and synthetic rubbers such as neoprene, nitrile rubber, SBR, CBR, IR, EBR and EPDM, curable rubber-resin blends such as blends of nitrile rubber and PVC such as "Paracril OZO" (trademark), compounded in the usual way with fillers, curatives, antioxidants, processing oils, and special purpose chemicals.

We generally prefer to use multifilament yarns as the textile reinforcement in the practice of our invention. As is well-known, such yarn consists of a bundle of continuous synthetic filaments each as long as the length of yarn itself. Alternatively, we can use staple yarns which consist of relatively short (e.g. 4-6 inches long) filaments twisted together to form a yarn of indefinite length. Still further, we could in some circumstances use so-called monofils which are solid single component elements generally cylindrical in cross-section and are available in any length. However, when monofils of the type now available are used the monofils are locked into a stiff rigid structure with the result that the hose produced is exceedingly stiff and is not acceptable in applications where flexibility is imperative.

For the circular knit reinforcement of our hose, we prefer to use multifilament yarns having low to moderate twist, i.e. yarns having a total twist of not less than 1 and not more than 5 turns per inch and most preferably yarns having from 1½ to 2½ turns per inch. These figures refer to total twist and include any producer's or manufacturer's twist which usually is not over one-half turn per inch. We could theoretically use yarns having considerably more than 5 turns per inch but the number of turns per inch is often limited in practice to a maximum of about 5 in part by the practical consideration of expense of twisting (since twisting adds to the cost).

While multifilament yarns having a total twist of from 0 to 15 turns per inch can be used in the practice of the invention, it is preferred to use such yarns having a total twist of from 1 to 5 turns per inch.

The following examples illustrate our invention. The inner tube used in each of the examples was made by extruding a copolymer of nylon 6 and nylon 66 at a temperature of 430° F. The tube had an inside diameter of five-sixteenths inch and a wall thickness of 0.030 inch.

The textile reinforcement used for the circular knitted layers in each of the examples was 2,520 denier nylon multifilament yarn having 1½ turns per inch twist. The knitted layers were applied by conventional circular knitting equipment having a 1⅝ inch knitting head with a 0.70 inch bore.

EXAMPLE I

A single circular knit layer was applied in a lock stitch to the inner tube. The resulting assembly was passed through a bath of 2 parts of resorcinol to 1 part of water at 160° F. at a rate to provide a 9 second immersion time. The assembly was then passed through a water bath at a temperature of 140° F. at a rate to provide a 9 second immersion time.

The assembly leaving the water bath was air dried at room temperature for 15 hours.

An outer protective jacket of a thermoplastic polyurethane was applied to the resulting assembly.

The hose thus made a burst strength of 800 pounds per square inch.

EXAMPLE 2

This was like Example 1 except that the single circular knit layer was diamond knit.

The resulting hose had a burst strength of 1,000 pounds per square inch.

EXAMPLE 3

Example 1 was duplicated except that two consecutive layers of lock stitch reinforcement were applied to the inner tube before the treatment with the resorcinol-water solution and subsequent processing.

EXAMPLE 4

Example 2 was duplicated except that two consecutive layers of diamond knit reinforcement were applied to the inner tube prior to treatment with the resorcinol-water solution and subsequent processing.

GENERAL

The various components of our hose, i.e. the inner tube, the knitted layer or layers of textile reinforcement and the outer jacket, can be formed from clear, opaque or pigmented polymeric material.

Figure 2:
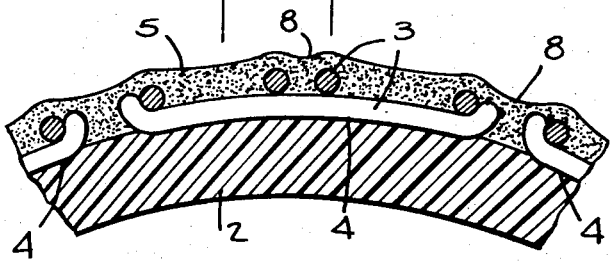
FIG. 2 is a greatly enlarged sectional view taken on line 2—2 of FIG. 1.
Figure 3:
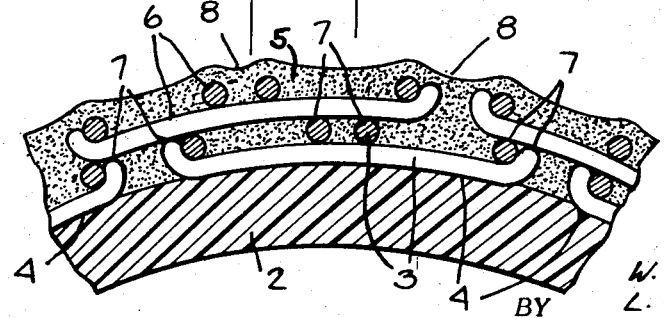
FIG. 3 is a greatly enlarged sectional view of a portion of hose of the invention but having two concentric layers of circular lock stitch knit textile reinforcement and FIG. 4 is a diagrammatic representation of typical equipment and method for making a hose of the invention.
Figure 4:
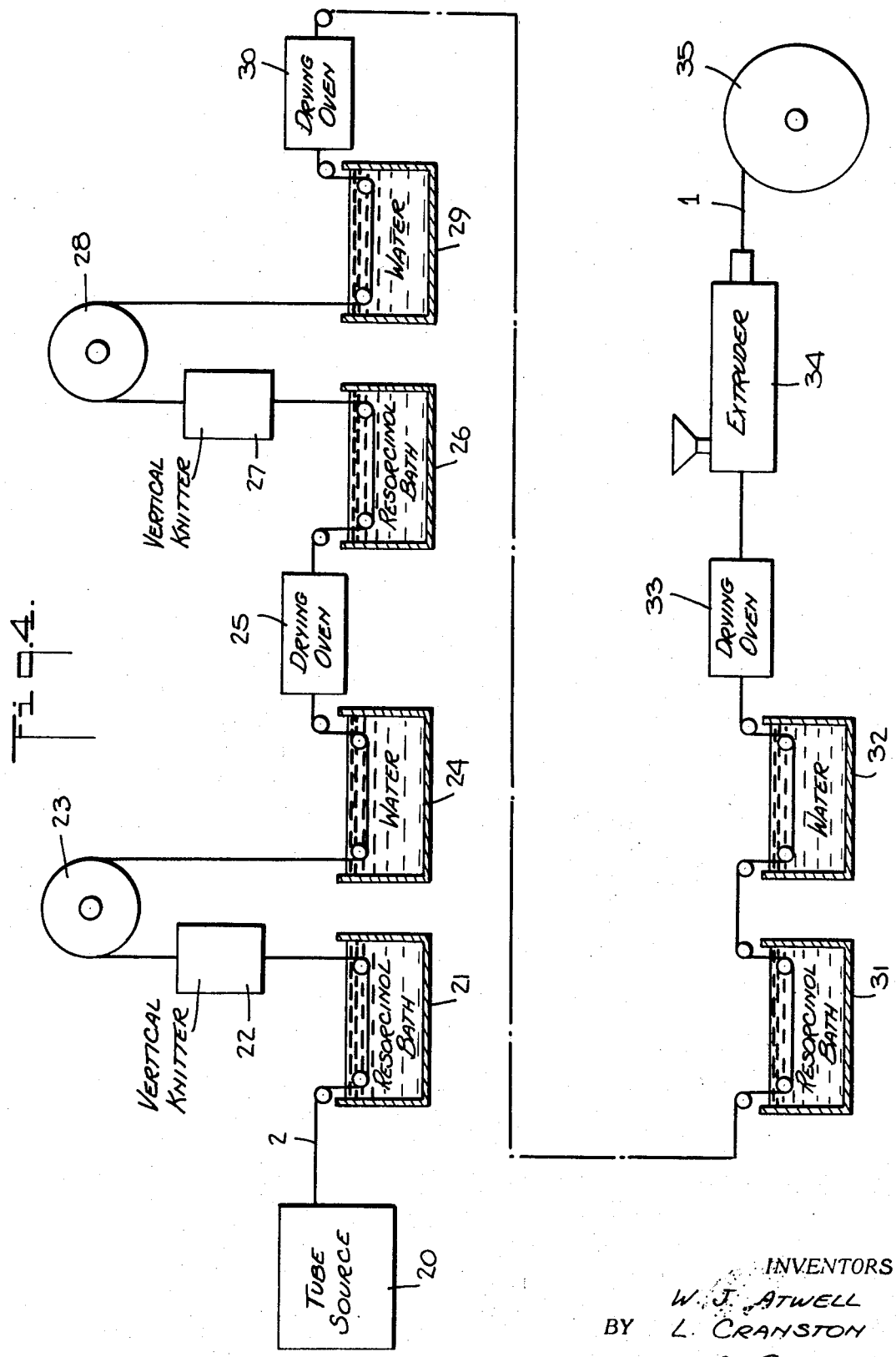

As shown in FIGS. 1–3, the outer surface of the outer jacket 5 has a moderately undulated surface with slight depressions 8 opposite spaces between yarns. This undulation occurs unintentionally and inherently in the extrusion step and in no way interferes with the usefulness of the hose.

The outer jacket 5 of our hose performs a number of functions. In addition to adding strength, it protects the underlying components against access of grease, oil, dirt, water, etc. and it protects the textile reinforcing elements from injury as by abrading, snagging or cutting. It adds greatly to the abrasion- and cut-resistance of the hose. If desired, it can be pigmented or otherwise compounded to reduce degradation by heat, ultraviolet light, ozone, etc.

By such terms as "fusion" and "fused," as used herein and in the claims, we refer to integral bonding or coalescence achieved by softening and/or plasticization of the contacting surfaces of both of two juxtaposed components of our hose whereby the plastic materials of both surfaces are caused to merge or coalesce and form an integral bond.

Having thus described our invention, what we claim and desire to protect by Letters Patent is:

1. A hose comprising an inner thermoplastic tube, a circular knitted layer of thermoplastic textile reinforcement around said tube in direct contact therewith and fused to the outer surface of said tube at the interface between said layer and said tube, and an outer protective polymeric jacket surrounding the assembly and bonded thereto.

2. A hose as defined in claim 1 wherein said textile reinforcing elements are multifilament yarns having a twist of from 0 to 15 turns per inch.

3. A hose as defined in claim 1 wherein said textile reinforcing elements are multifilament yarns having a twist of from 1 to 5 turns per inch.

4. A hose as defined in claim 1 wherein said inner tube and said textile reinforcement are of nylon.

5. A hose comprising an inner nylon tube, a first circular knitted layer of nylon textile reinforcement around said tube in direct contact therewith and fused to the outer surface of said tube at the interface between said first layer and said tube, a second circular knitted layer of nylon textile reinforcement in direct contact with said first layer, the elements of said first knitted layer and said second knitted layer being fused to one another at the areas of contact therebetween, and an outer protective jacket surrounding the assembly and bonded thereto.

6. A hose comprising an inner nylon tube, a first circular knitted layer of nylon textile reinforcement around said tube in direct contact therewith and fused to the outer surface of said tube at the interface between said first layer and said tube, a second circular knitted layer of nylon textile reinforcement in direct contact with said first layer, the elements of said first knitted layer and said second knitted layer being fused to one another at the areas of contact therebetween, and outer protective jacket surrounding the assembly and bonded to the exposed portions of the underlying assembly which exposed portions were activated by plasticization thereof with a plasticizing agent removed prior to application of said jacket.

7. A hose comprising an inner nylon tube, a plurality of superimposed circular knitted layers of nylon textile reinforcement around said tube, the innermost of said knitted layers being fused to the outer surface of said tube at the interface between said innermost layer and said tube, the elements of each pair of adjoining knitted layers being fused to one another at the areas of contact between such adjoining layers, and an outer protective jacket surrounding the assembly and bonded thereto, said outer jacket impregnating and filling the accessible interstices of the underlying assembly.

8. A hose comprising an inner nylon tube, a plurality of superimposed circular knitted layers of nylon textile reinforcement around said tube, the innermost of said knitted layers being fused to the outer surface of said tube at the interface between said innermost layer and said tube, the elements of each pair of adjoining knitted layers being fused to one another at the areas of contact between such adjoining layers, and an outer protective nylon jacket surrounding the assembly and bonded to the exposed portions of the underlying assembly which exposed portions were activated by plasticization thereof with a plasticizing agent removed prior to application of said jacket.

9. A hose as defined in claim 7 wherein said outer jacket is formed of a polyurethane.

* * * * *